United States Patent
Yu et al.

(10) Patent No.: US 12,017,362 B2
(45) Date of Patent: Jun. 25, 2024

(54) PRODUCTIVITY PLUGIN FOR INTEGRATION WITH ROBOTIC PROCESS AUTOMATION

(71) Applicant: Automation Anywhere, Inc., San Jose, CA (US)

(72) Inventors: Yongke Yu, San Ramon, CA (US); Sendam Ravikumar, San Jose, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 885 days.

(21) Appl. No.: 16/671,130

(22) Filed: Oct. 31, 2019

(65) Prior Publication Data

US 2021/0129325 A1     May 6, 2021

(51) Int. Cl.
| | |
|---|---|
| *B25J 9/16* | (2006.01) |
| *B25J 13/00* | (2006.01) |
| *G05B 19/4155* | (2006.01) |
| *G06F 9/445* | (2018.01) |
| *G06F 9/451* | (2018.01) |

(52) U.S. Cl.
CPC ............ *B25J 9/1661* (2013.01); *B25J 13/00* (2013.01); *G05B 19/4155* (2013.01); *G06F 9/44526* (2013.01); *G06F 9/451* (2018.02); *G05B 2219/34348* (2013.01)

(58) Field of Classification Search
CPC .................................................. G06F 9/44526
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |
| 6,133,917 A | 10/2000 | Feigner et al. |
| 6,389,592 B1 | 5/2002 | Ayres et al. |
| 6,427,234 B1 | 7/2002 | Chambers et al. |
| 6,473,794 B1 | 10/2002 | Guheen et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Kevin L Young
*Assistant Examiner* — Carina Yun

(57) ABSTRACT

Robotic process automation (RPA) tasks for operating on data within a productivity program may be initiated by single user action from within the productivity program. A user device is provided with a plugin program that provides an automation user interface within the productivity program. A request to perform an automation task on data in a productivity file is received along with identification of a software robot to perform the automation task. The request also specifies data from the productivity file. The request is provided to a control room server that controls execution of a plurality of different automation tasks by a plurality of different software robots. Results of the automation task are received from the control room server and are provided to the plugin program, which provides the results of the automation task to the user within a productivity file accessible by the user.

18 Claims, 10 Drawing Sheets

(56) References Cited

U.S. PATENT DOCUMENTS

| | | |
|---|---|---|
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Fotev |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 9,104,294 B2 | 8/2015 | Forstall et al. |
| 9,213,625 B1 | 12/2015 | Schrage |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,621,584 B1 | 4/2017 | Schmidt et al. |
| 9,946,233 B2 | 4/2018 | Brun et al. |
| 2003/0033590 A1 | 2/2003 | Leherbauer |
| 2003/0101245 A1 | 5/2003 | Srinivasan et al. |
| 2003/0159089 A1 | 8/2003 | DiJoseph |
| 2004/0083472 A1 | 4/2004 | Rao et al. |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2007/0101291 A1 | 5/2007 | Forstall et al. |
| 2007/0112574 A1 | 5/2007 | Greene |
| 2008/0005086 A1 | 1/2008 | Moore |
| 2008/0028392 A1 | 1/2008 | Chen et al. |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0100605 A1 | 4/2010 | Allen et al. |
| 2010/0138015 A1 | 6/2010 | Colombo et al. |
| 2010/0235433 A1 | 9/2010 | Ansari et al. |
| 2011/0022578 A1 | 1/2011 | Fotev |
| 2011/0145807 A1 | 6/2011 | Molinie et al. |
| 2011/0197121 A1 | 8/2011 | Kletter |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0042281 A1 | 2/2012 | Green |
| 2012/0124062 A1 | 5/2012 | Macbeth et al. |
| 2012/0330940 A1 | 12/2012 | Caire et al. |
| 2013/0173648 A1 | 7/2013 | Tan et al. |
| 2013/0290318 A1 | 10/2013 | Shapira et al. |
| 2014/0181705 A1 | 6/2014 | Hey et al. |
| 2015/0082280 A1 | 3/2015 | Betak et al. |
| 2015/0347284 A1 | 12/2015 | Hey et al. |
| 2016/0019049 A1 | 1/2016 | Kakhandiki et al. |
| 2016/0078368 A1 | 3/2016 | Kakhandiki et al. |
| 2018/0329399 A1* | 11/2018 | Neelakandan ... G06Q 10/06315 |
| 2020/0004798 A1* | 1/2020 | Weinert, Jr. .......... G06F 16/958 |
| 2020/0327116 A1* | 10/2020 | Perlick ................. G06F 40/131 |
| 2021/0097274 A1* | 4/2021 | Gligan ................. G06F 40/123 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Business Process Modeling Notation (BPMN), BPMI.org, v. 1.0, May 3, 2004.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Process Modeling Notations and Workflow Patterns, S. White, IBM Corp.

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

* cited by examiner

PRODUCTIVITY PLUGIN FOR INTEGRATION WITH ROBOTIC PROCESS AUTOMATION

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

Many tasks in a business environment are performed within productivity programs, such as a spreadsheet—Microsoft Excel® for example. Automating tasks performed within a spreadsheet by way of RPA exists, but can be cumbersome. There is accordingly a need to simplify the automation of tasks performed in a productivity program, such as a spreadsheet program in order to increase the efficiency and speed with which computerized systems may process operations within a file associated with a productivity program.

SUMMARY

Robotic process automation (RPA) tasks for operating on data within a productivity program may be initiated by single user action from within the productivity program. A user device is provided with a plugin program that provides an automation user interface within the productivity program. A request to perform an automation task on data in a productivity file is received along with identification of a software robot to perform the automation task. The request also specifies data from the productivity file. The request is provided to a control room server that controls execution of a plurality of different automation tasks by a plurality of different software robots. Results of the automation task are received from the control room server and are provided to the plugin program, which provides the results of the automation task to the user within a productivity file accessible by the user.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. Elements designated with reference numbers ending in a suffix such as .1, .2, .3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
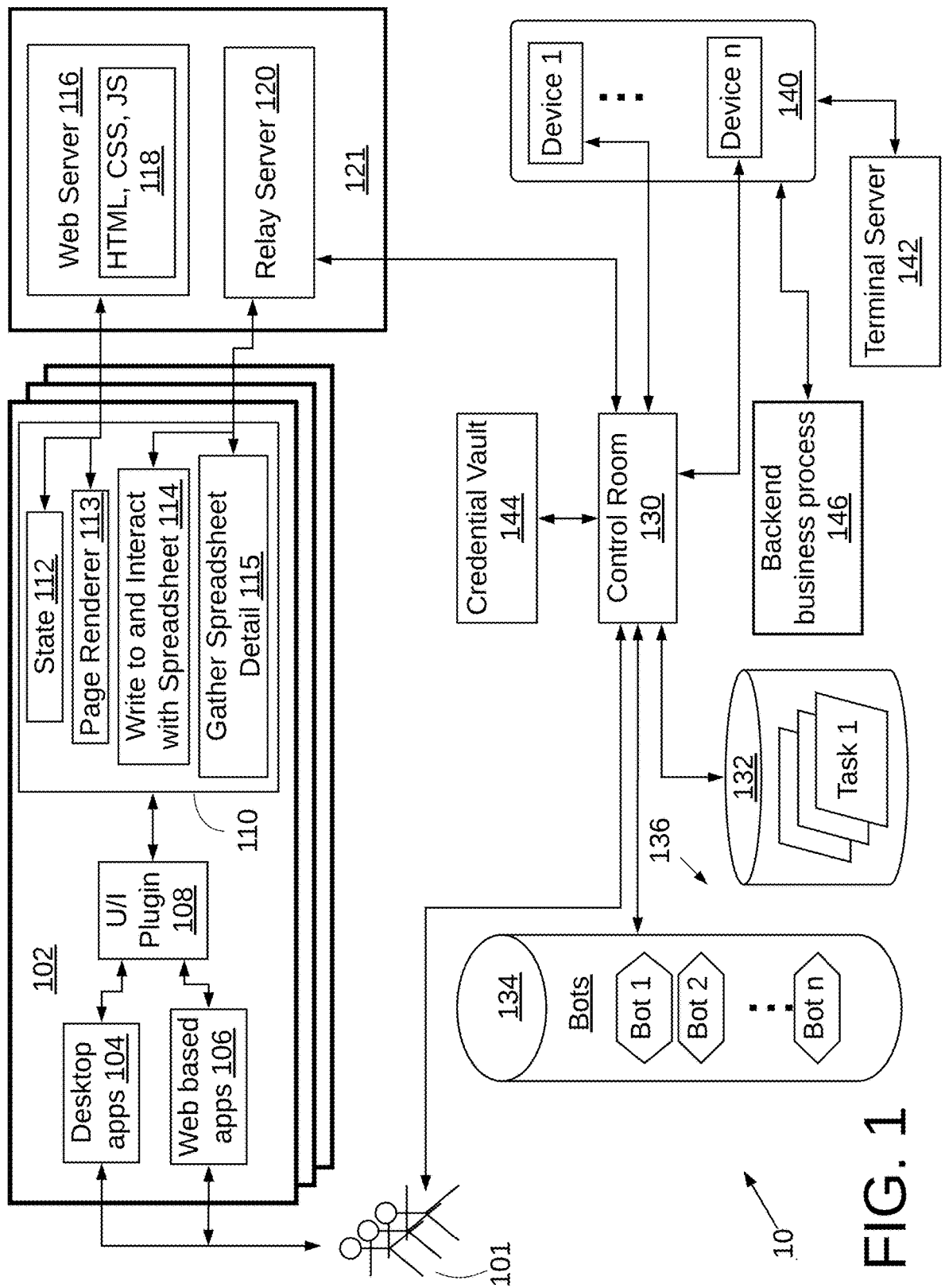
FIG. 1 is a high-level block diagram of an embodiment of an RPA system with an integrated spreadsheet plugin.

In FIG. 1, a user 101 interacts with applications such as desktop-based applications 104 and web-based applications 106. The desktop-based applications 104 execute directly on device 102, which may take a form such as a personal computer, tablet, or other computing device. A single device 102 is shown in detail, and as shown, multiple devices 102 may exist with a user 101 associated with each device 102 which runs the applications and other software described herein. The web-based applications 106 execute partially or entirely on a remote device and interact with user 101 via a conventional browser. The applications 104/106 include a spreadsheet application, such as Microsoft Excel® available from Microsoft Corporation, and may include other productivity applications such as a word processing application, a presentation application and an e-mail application. As is commonly known, a spreadsheet is an interactive computer application for organization, analysis and storage of data in tabular form. It provides to the user, and permits the user to develop, an electronic document in which data is arranged in the rows and columns of a grid and can be manipulated and used in calculations. The principles described herein are not limited to a spreadsheet application and may be employed in connection with other productivity applications.

A user interface (U/I) plugin 108 operates to permit user 101 to simply, with one-click, run directly from the spreadsheet, a software robot, such as a bot 134 (described below) to perform a task on data in a spreadsheet and to receive the results, either in the spreadsheet file from which the task was performed, or in another spreadsheet, or elsewhere. The spreadsheet file is referred to herein in the context of an embodiment where the productivity program from which the bot is invoked is a spreadsheet program. The spreadsheet file is an embodiment of a productivity file which in other embodiments may take the form of a word processing file or a presentation file (e.g. such as produced by Powerpoint® from Microsoft Corp. or Keynote® from Apple Inc. or similar programs). Data in the spreadsheet is passed by the plugin 108 to the selected bot 134 and results are received by the plugin 108 from the bot 134. The plugin 108 advantageously operates with either a desktop-based spreadsheet, or a web-based spreadsheet such as provided in the Office 365™ application from Microsoft Corporation. In certain embodiments, the plugin 108 is not limited to operation with a single platform or product such as available from Microsoft Corporation but rather is agnostic to the operating system on which it runs and may work on other platforms such as the MacOS® available from Apple Inc., the Android® operating system available from Google, Inc. or the Linux® operating system available from a variety of sources, and with spreadsheet applications other than Excel®.

The plugin 108 communicates with modules 112, 113, 114, and 115 that are part of an Application Program Interface (API) 110 that permits applications to communicate with object models that support the application and that execute on a server-based host. An example of such an API is the Office JavaScript API available from Microsoft Corp., which permits desktop and web-based applications to interact with object models in Office host applications. The application references an office.js library in module 118 described below, which is a script loader. The office.js library loads the object models that are applicable to the Office application that is running an add-in, such as plugin 108. Any number of supported JavaScript object models may be employed. Further information on the Office JavaScript API is available from Microsoft Corp. and may be found at docs.microsoft.com.

Specifically, the API 110 includes a state module 112 that tracks user state, a page renderer 113 that renders the user-interface as needed by the application 104/106 based on the application and physical aspects of the screen on which the application is displaying output. A Write to and Interact with Spreadsheet module 114 operates to write data to a specified spreadsheet and otherwise interact with the specified spreadsheet. A Gather Spreadsheet Detail module 115 operates to transfer data and meta-data from a spreadsheet being used by a user 101 for transmittal to relay server 120. The state module 112 and page renderer 113 interact with a conventional web server 116 which includes conventional web serving capabilities such as providing files of data and code encoded in a variety of conventional encodings 118 such as HyperText Markup Language (HTML), Cascading Style Sheets (CSS), and JavaScript (JS). The Write to and Interact with Spreadsheet module 114 and the Gather Spreadsheet Detail module 115 interact with Relay Server 120, described in further detail below. In one embodiment, the foregoing modules 112, 113, 114, 115 may be implemented by the following API's available in the Microsoft Office JavaScript API, available from Microsoft Corporation: Manage State (module 112), Page Render (module 113), Gather Spread Sheet Data (module 115), Write to and interact with Excel (module 114).

Relay Server 120 operates to facilitate communication between a spreadsheet program being used by user 101 and the RPA system 10, and specifically Control Room 130 which controls the operations of the system 10. The Web Server 116 and the Relay Server 120 are both shown executing on a server 121. This is shown for purposes of illustration and the servers 116 and 121 may execute on separate servers or may each be distributed across more than one server, including physical and virtual machines.

The robotic process automation system 10 includes data storage, seen generally at 136 which stores a plurality of sets of task processing instructions 134. Each set of task processing instructions 134 implements a software robot, also referred to as a bot (seen as Bot 1, Bot 2, . . . , Bot n) which is operable to interact at a user level with one or more designated user level application programs, such as generally shown at 146. As used herein, the term "bot" is generally synonymous with the term software robot. In certain contexts, as will be apparent to those skilled in the art in view of the present disclosure, the term "bot runner" refers to a device (virtual or physical), having the necessary software capability, on which a bot will execute or is executing, such as for example a device 140 loaded with and executing a bot 134. The data storage 136 also stores a plurality of work items 132, where each work item 132 is stored for subsequent processing by executing a corresponding set of task processing instructions 134 (also referred to as a bot which implements each set of task processing instructions). A Control Room, seen generally at 130, is operatively coupled to the data storage 136 and is configured to execute instructions that when executed cause the RPA system 10 to respond to a request from a client device 140 that is issued by a user 101 to act as a server to provide to the client device 140 the capability to perform an automation task to process a work item from the plurality of work items 132. The user 101 interacts with the Control Room 130 to schedule automation tasks to be performed on one or more devices 140 as if the user 101 were manually interacting with the necessary application program(s) and the operating system of the devices 140 to perform the tasks directly. The Control Room 130 in conjunction with credential vault 144 holds all software application license and user information. The Control Room 130 also tracks all bots that have been deployed and knows the status of all deployed bots. Each bot 134 in the course of execution may interact with one or more backend business processes 146 which may be implemented in whole or in part by conventional enterprise applications such as Enterprise Resource Planning (ERP) applications or Customer Relationship Management (CRM) applications.

Each client device 140 may take a variety of forms such as a physical machine, for example, a desktop computer, laptop computer or tablet. Each client device 140 may also be a virtual device such as provided by conventional virtualization software which permits multiple operating system sessions to be run on a single computer. Each client device 140 may have applications loaded thereon on local storage. Typically the client device 140 will be separate from the device 102 used by user 101, but in some instances, particularly if the device 102 is virtual or if the device is served by terminal server 142, the device 102 and device 140 that executes a bot 134 may be the same device.

In some cases, a client device 140 may employ applications hosted by a server and accessed by the client device by way of a terminal server 142. A terminal server enables an organization to centrally host applications and resources and publish them to remote client devices, regardless of the location and platform of the end user device. This permits remote access of an application that may not otherwise be designed to be remotely accessed. Moreover, the central deployment of an application simplifies the installation and update of the application. This also provides cost benefits by reducing in some cases licensing costs of the application. An example of terminal server software is the Parallels Remote Application Server available from Parallels Inc. or Remote Desktop Services available from Microsoft Corporation. With such systems, the user interface is displayed from the server onto the client system and input from the client system is transmitted to the server, where execution of the application takes place.

Some or all of the bots 134 may in certain embodiments be located remotely from the Control Room 130. Moreover, any of the devices 140 may also be located remotely from the Control Room 130. The bots 134 and the tasks 132 are shown in separate containers for purposes of illustration but they may be stored in separate or the same device(s), or across multiple devices. The Control Room 130 performs user management functions, source control of the bots 134, along with providing a dashboard that provides analytics and results of the bots 134, performs license management of software required by the bots 134 and manages overall execution and management of scripts, clients, roles, credentials, and security etc. The major functions performed by the Control Room 130 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the Control Room; (vi) task scheduler—permits scheduling tasks which need to be executed on different clients at any particular time; (vii) credential management—permits password management; and (viii) security: management—permits rights management for all user roles. The Control Room 130 is shown generally for simplicity of explanation. Multiple instances of the Control Room 130 may be employed where large numbers of bots are deployed to provide for scalability of the RPA system 10.

The centralized credential vault (CV) 144 operates to securely store all credentials and provision them to bots on an on-demand basis. The CV 144 preferably implements NIST controls IA-2 to uniquely identify and authenticate organizational users (or processes acting on behalf of organizational users). Since sensitive credentials need not be stored in bots or on bot runner systems, the CV 144 facilitates a logical separation of credentials from the bots. CV 144 variables are created from Control Room 130 and are instantly available to all the bot creators and bot runners registered with the respective Control Room 130. The CV 144 adds flexibility and dynamic character to bots since only the credential references are present in the bots and not the credentials. When bots are moved from one environment to another environment, absolutely no change is needed in bots. Bots can seamlessly pick up the credential values applicable for the new environment from the Control Room 130 of that environment. Additionally, the Control Room 130 automatically stores configuration related sensitive data into the CV 144 by default. Additional details of the credential vault 144 are described in pending U.S. patent application Ser. No. 15/957,917 entitled "ROBOTIC PROCESS AUTOMATION SYSTEM AND METHOD WITH SECURE CREDENTIAL VAULT" which is assigned to the assignee of the present application and which is hereby incorporated by reference in its entirety.

The disclosed embodiments operate to extend the functionality of the Control Room 130 as it operates with spreadsheet programs, such as Microsoft Excel®, and specifically to be able to call a bot 134 from a spreadsheet program and pass data into the spreadsheet program, under the attended running environment. In one embodiment the foregoing functionality is embodied in plugin 108. An embodiment of the user interface is seen in FIGS. 2A, 2B, 2C, 2D, 2E and 2F. Installation of the plugin 108 causes an additional user selectable tab, seen as the Automation tab 202 to be provided to the user. Upon clicking on the Automation tab 202 the user 101 is presented with a ribbon menu seen at 204 which provides selection of functions specific to an automation function. The ribbon menu 204 is divided up into four main parts: (i) Settings 206: setup configuration, (ii) Bots 208: running a bot and handling results, (iii) Favorites 210: Setting up and running bot with 1-click, and (iv) Help 212: Getting help. In the embodiment shown in FIGS. 2A-2F, when user 101 clicks on a button on the ribbon menu 204, sometimes a panel, such as seen at 214 will popup from the right-hand side of Excel®. Sometimes there is no panel and the function will just run in the background.

Figure 2A:
FIGS. 2A, 2B, 2C, 2D, 2E, and 2F are screen shots showing details of various user interface screens of the integrated spreadsheet plugin.
Figure 2B:
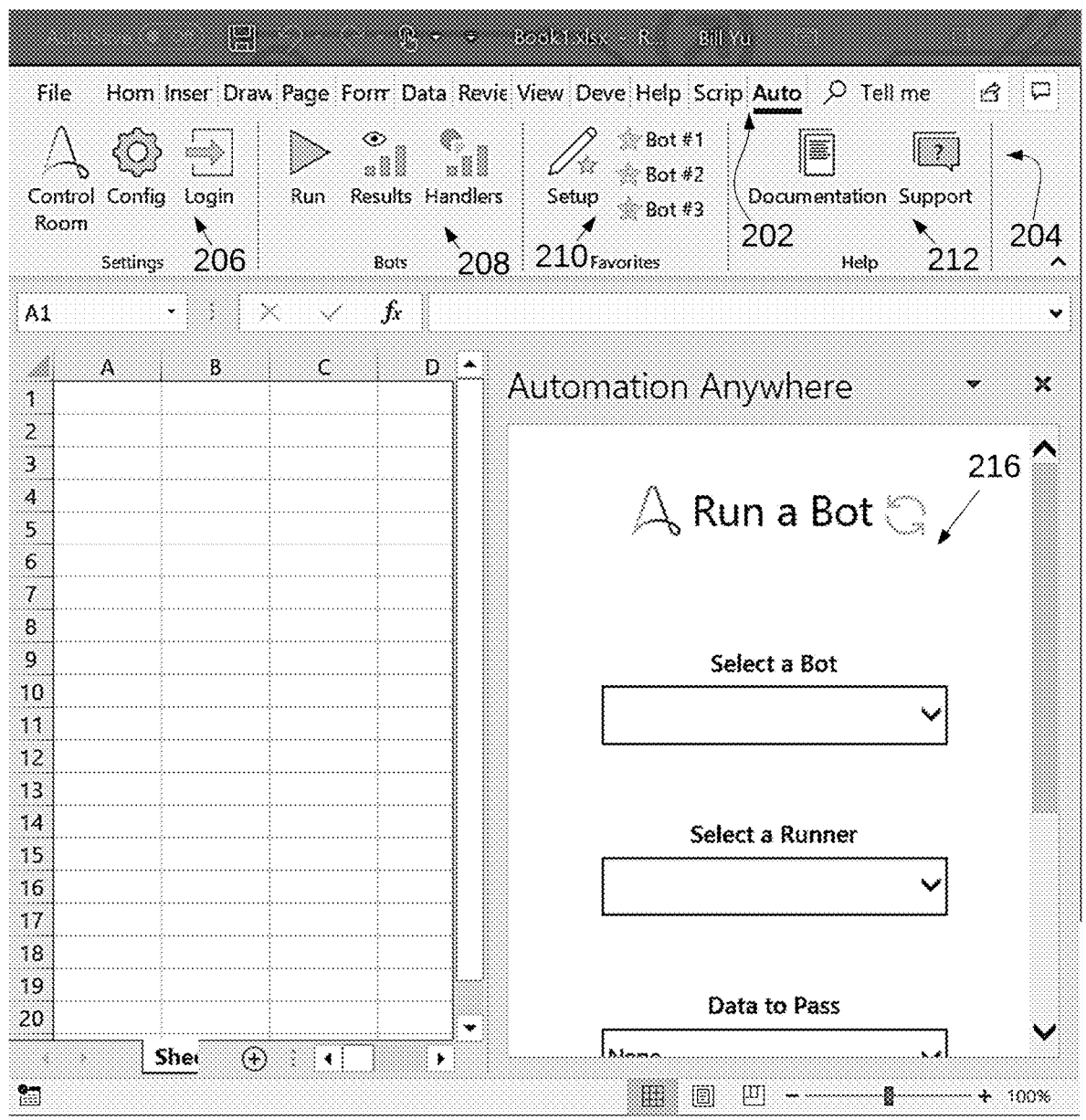

The Settings section 206 has three buttons: (i) Control Room: this is a web link to the user's 101 Control Room 130, (ii) Config: the user 101 can set the Control Room 130 URL here, (iii) Login: the user 101 can enter their username and password here. In FIG. 2A, the user 101 has selected the login button in Settings section 206. The plugin 108 responds by providing the login dialog seen at 214. For login, the user's username and password must be entered here to use any of the functionality provided by the system 10. The user can optionally save their password if they like. In one embodiment, the user's credential will be saved inside the spreadsheet and will not be available or sent to anywhere else. In one embodiment the user 101 must click on the "Login" button every time to log in to the user's Control Room 130 on this page due to security policies. If the user 101 would like to get results back from their bot 134 into the spreadsheet, the login account must also have administrative permission. In settings 206 the user 101 must select the Config. Button, as shown in FIG. 2E, and enter at dialog 222, an IP address of the user's Control Room 130. The user's 101 Control Room 130 needs to have a legitimate external IP address that is reachable from the internet. In some deployments, the plugin 108 will be deployed to various device 102 by an administrator (as explained in connection with FIG. 4). In such an instance the administrator may also enter the IP address and other configuration information to minimized setup by the user 101 and also to permit single-click deployment of a bot to operate on selected data in the spreadsheet.

The Bots section 208 has three buttons: (i) Run: run a bot 134 immediately, (ii) Results: view bot 134 run status and also see the returned data, also run handler for each result, (iii) Handlers: define the result handler and test it. In FIG. 2B, the user 101 has selected the Run button in section 208. The plugin 108 responds by providing the dialog at 216. The user 101 can run any bot 134 in their Control Room 130 that they have permission to run. The following requirements are needed before a bot can be run successfully: (i) the provided login credential has the correct permission to run a bot, (ii) there exists a bot 134 in the Control Room 130 that can be ran, (iii) there exists a runner in the Control Room 130 that is logged in with an unattended license attached. Optionally, the user 101 can select a result handler, this is not mandatory. If a handler is specified, it will automatically be triggered when the result comes back from the Control Room 130. Data for processing by a bot 134 may be specified by visually selecting the cells in the spreadsheet, or by specifying in the dialog box 216 the cells for processing (e.g. A1:C14), or by specifying a file name. In some instances, the user 101 may specify processing of a task by a bot 134 that does not require the passing of data by the plugin 108. In some instances, the data to be passed may be specified by an administrator, thereby further simplifying the process for the user 101.

Figure 2C:
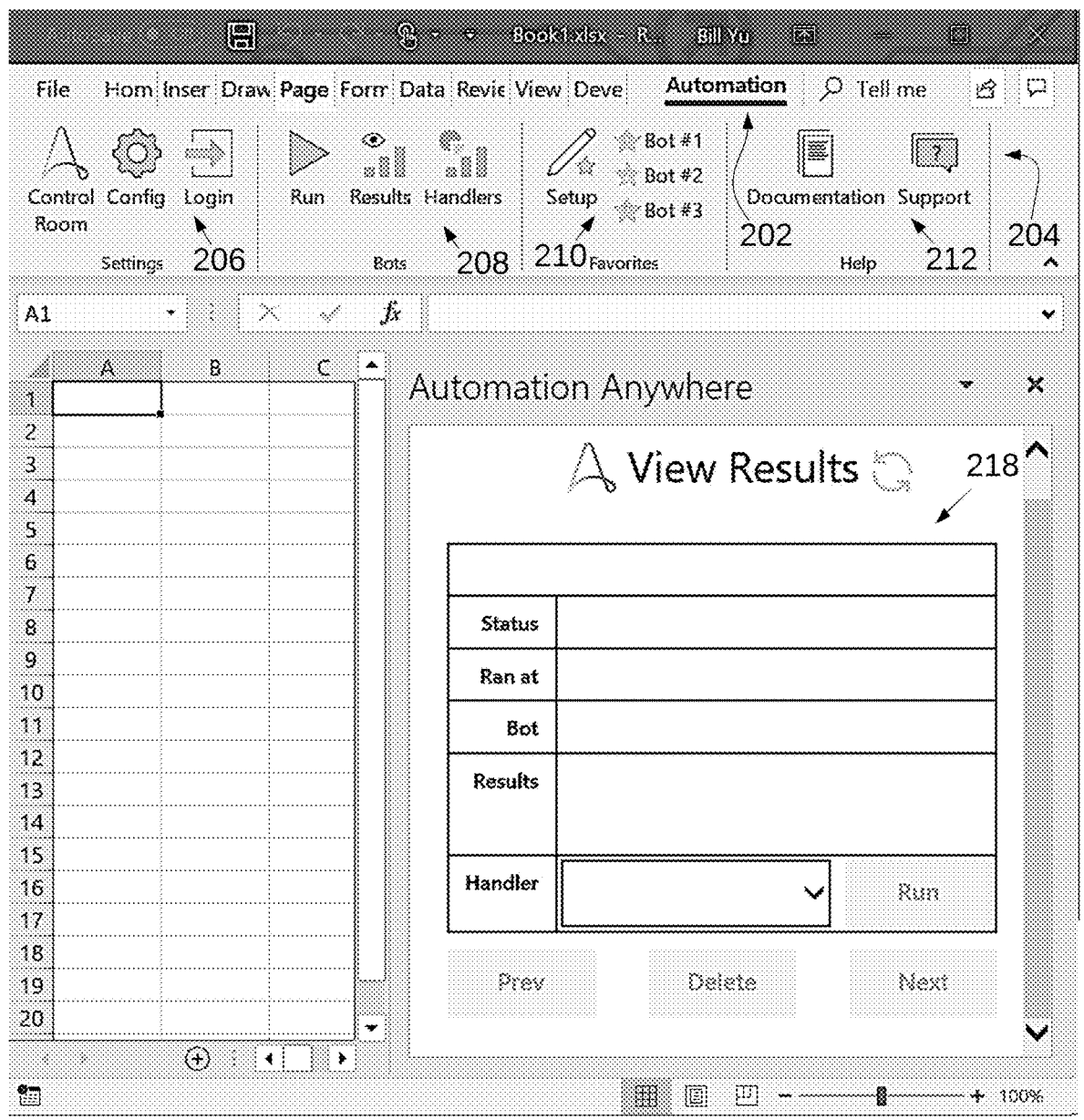

The Results panel seen in FIG. 2C allows the user 101 to view and browse results, such as in dialog 218. All results will be saved here, in order of triggered date/time. The following information is preferably available: (i) the result ID, (ii) the result status, for example: Running, Failed, Completed, (iii) the time the bot 134 was ran at, (iv) the bot 134 that was ran, and (v) the result that was returned by the bot 134 (if available).

Figure 2D:
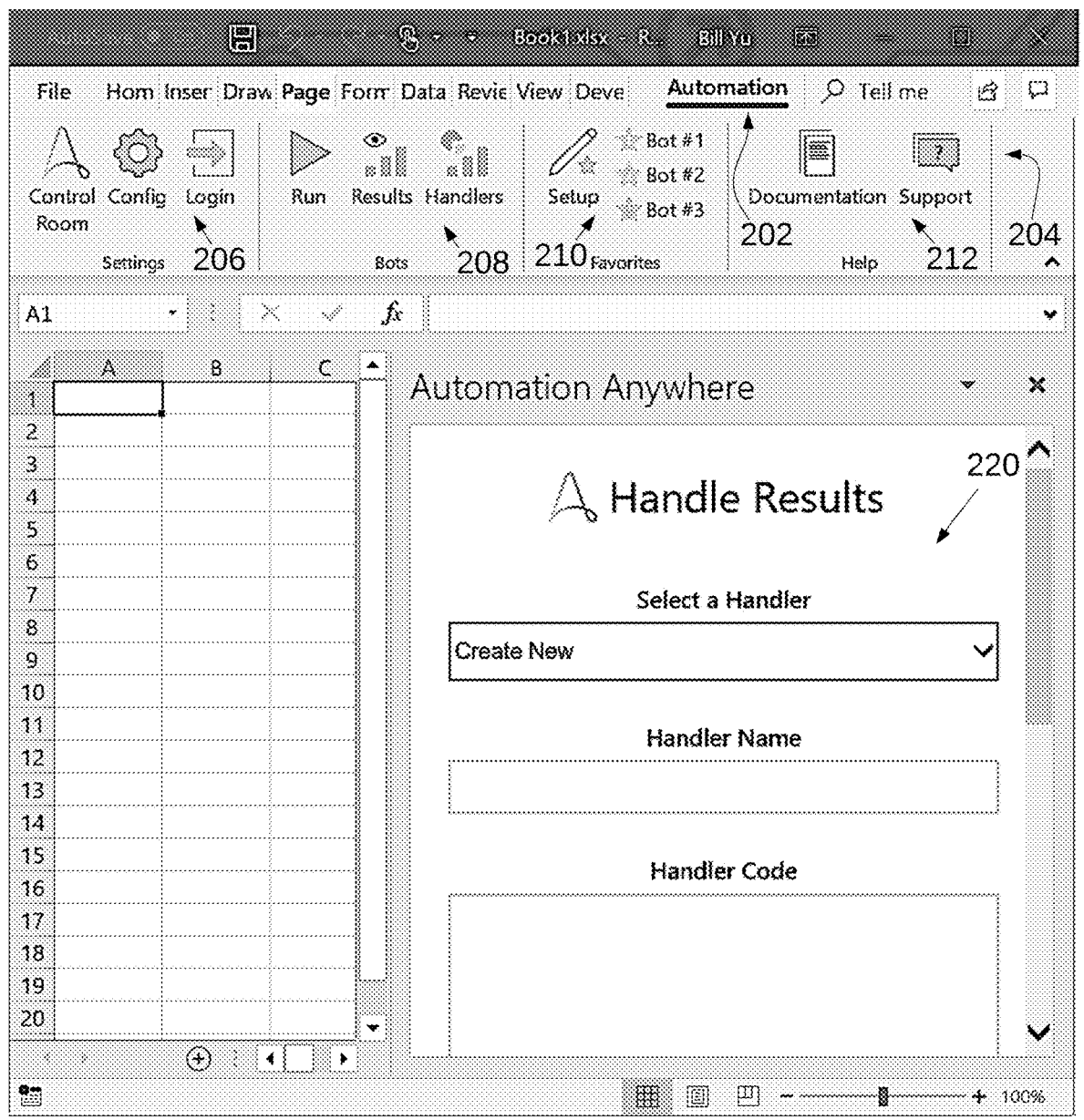
Figure 2E:
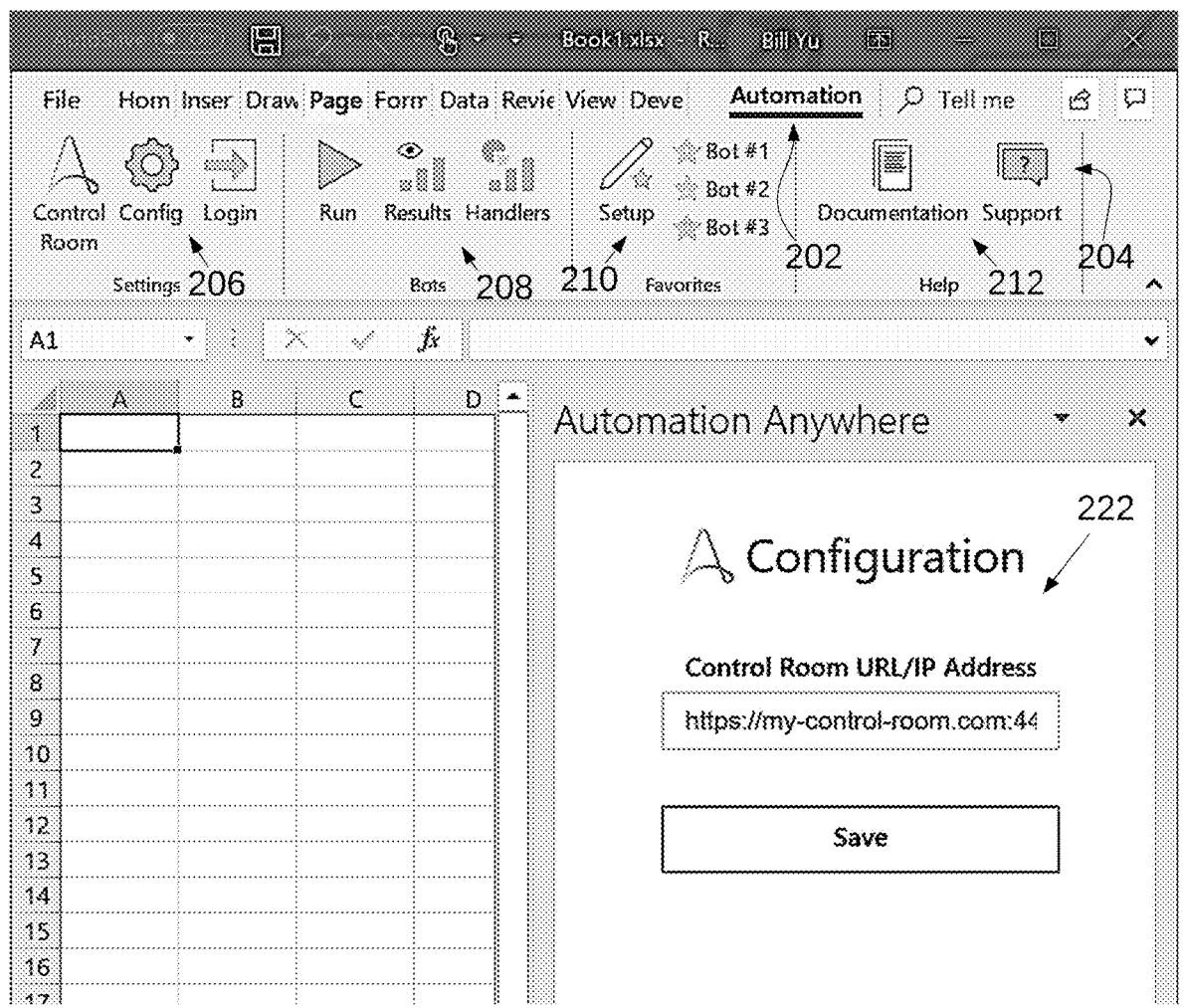

A Handler, seen selected in FIG. 2D is a piece of JavaScript code that can be run in the spreadsheet program to handle the result returned from the bot 134 after it is triggered. The user 101 can have a handler that saves the result in a cell, or call a REST API, or highlight some value, or anything else they want to do. In the specific case of in Excel®, the user 101 must call the Office JS API. Prewritten default handlers may be provided in the system 10 as examples, and they can be edited and added to. The user 101 can also create a new handler from scratch. Each handler created by a user 101 must have a unique name. For Excel® the handler code must be in JavaScript and will run using JS eval.

In one embodiment, a default handler is selected by default to save results to a new spreadsheet. This handler will dump the returned data from the user's bot into a new spreadsheet. In such an embodiment, there are two parameters that the user can customize: spreadsheet name and starting cell location (A1 by default), with each variable occupying its own row. Alternatively, as seen at 220 in FIG. 2D, a handler may be specified by the user 101.

Figure 2F:
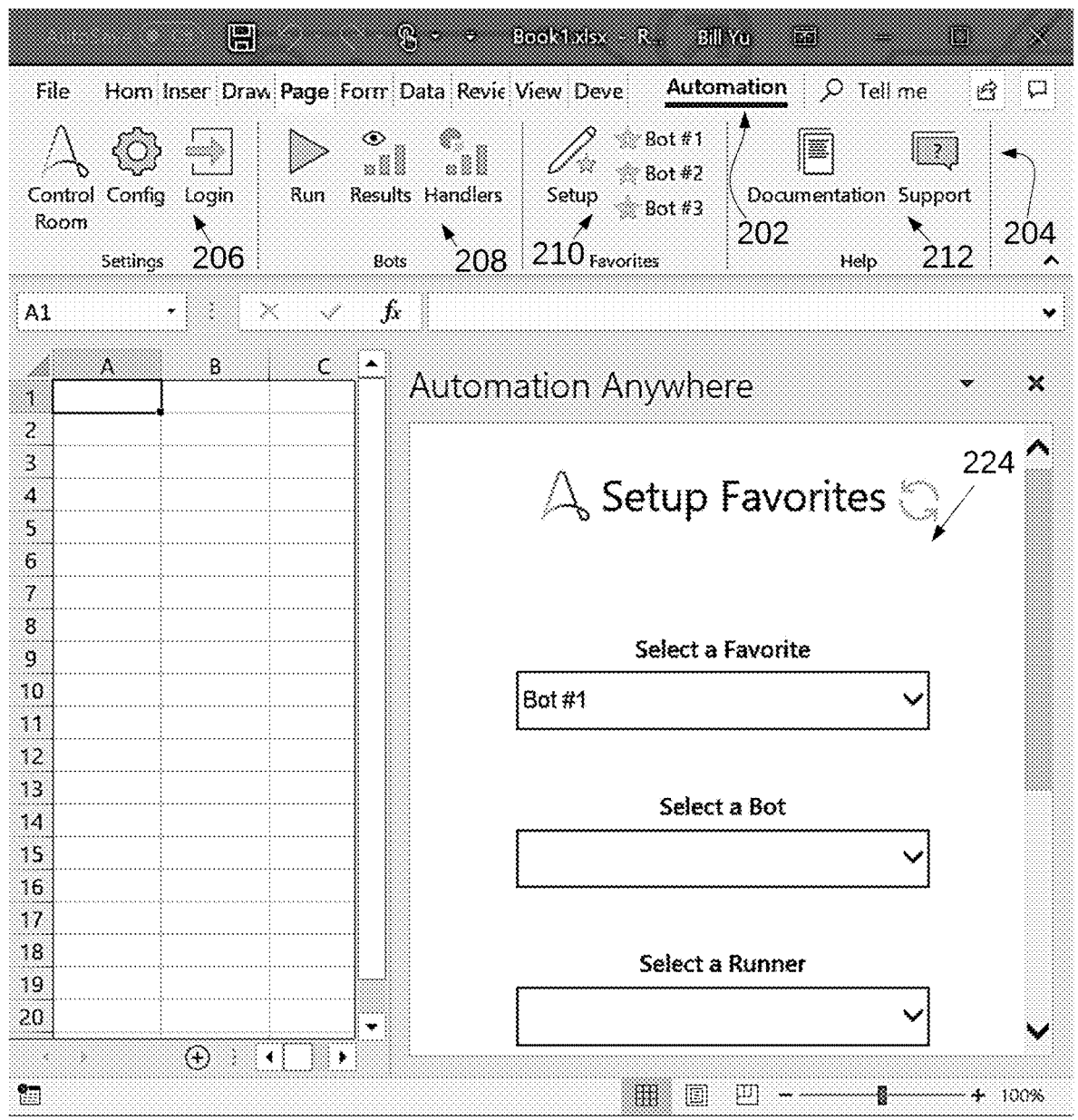

The Favorites section 210, seen selected in FIG. 2F, allows the user 101 to setup favorite bots 134 for one-click run. In one embodiment, three favorite selections are supported. The user 101 must setup each favorite in the Config page, as seen at 224, then the user 101 can do one-click run of the bot 134. After the user 101 has setup each favorite correctly, they can then directly call that favorite by clicking on the icon from Excel®. The following variables must be provided to be able to save correctly: (i) Select a Favorite: Which favorite to save to; (ii) select a bot: Which bot to call; (iii) select a bot runner: which device 140 will the bot 134 run on; (iv) Data to Pass: how would the user 101 like to pass any data to the bot 134, it is possible to not pass any data at all; (v) Range Select: specify the range of data to pass, if any; (vi) Result Handler: which handler script to run to handle the result back from the bot 134, the user 101 may select None.

Figure 3:
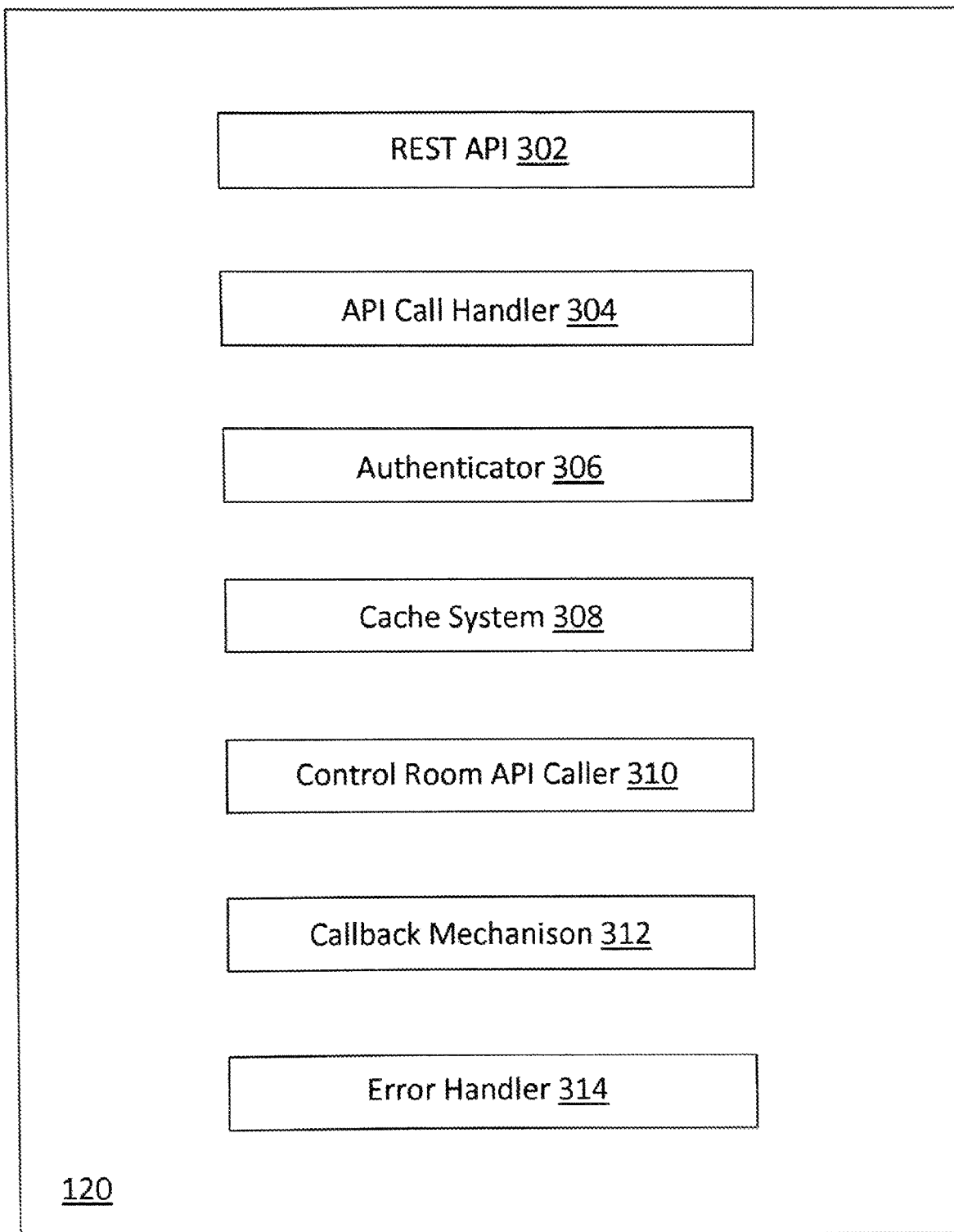
FIG. 3 is a block diagram illustrating further details of the plugin of FIG. 1

Further details of the plugin 108 are shown in FIG. 3. The REST (REpresentational State Transfer) API 302 provides a stateless separation of client, such as the U/I plugin 108 and the Relay server 120. As will be understood by those skilled in the art, in a stateless separation, the server and the client can understand any message received, even without seeing previous messages. In a REST architecture, clients send requests to retrieve or modify resources, and servers send responses to such requests. The REST API 302 interacts with an API Call Handler 304 which operates to convert the standardized interface of the REST API 302 into commands formatted to permit engagement with the Control Room 130. The Authenticator 306 receives user identification and credentials from the API Call Handler 304 and provides them to Control Room 130 to permit determination by the Control Room 130 of the identity of the user (is the user who they say they are?) and the credentials of the user (does the user have the permission to permit the task(s) requested?). The Cache System 308 caches information passed between the plugin 108 and the Control Room 130. For example, a task requested by user 101 that is to be performed by a bot 134 under control of Control Room 130 may take minutes or hours to perform. The Cache System 308 will receive the results performed by the bot 134 when completed and cause the results to be transferred to the plugin 108. In the other direction, a request by plugin 108 may need to be cached before transmittal to the Control Room 130 if the Control Room 130 is busy. The Cache System 308 invokes the services provided by the Control Room 130 by way of Control Room API Caller 310 which provides a programmatic interface by which functions of the Control Room 130 may be invoked. Such functions are described in further detail below. Interaction with the Control Room in the embodiment shown in FIG. 3 is performed by way of callbacks implemented by Callback Mechanism 312. As will be appreciated by those skilled in the art in view of the present disclosure, a callback permits a requested function to be executed (called back) at some later point in time when a containing function (which contains the requested function) is performed by the server requested to perform the requested function. This is particularly useful in the case of bot execution where, for example, a device 140 may not be available immediately to execute a requested bot 134. In such an instance the Callback Mechanism 312 permits the request to be provided and the results can be received at some later point in time by a callback from the Control Room 130 to the Relay Server 120. Error Handler 314 resolves errors that are encountered by translating errors to user friendly, descriptive messages for the user 101.

As noted above, the plugin 108 operates programmatically with the system 10 to invoke functions supported by the Control Room 130 to automate tasks performed on data in a spreadsheet designated by user 101. In one embodiment, the plugin 108 by way of Relay Server 120 operates in conjunction with a Control Room 130 such as provided by Automation Anywhere, Inc. (automationanywhere.com). In such an embodiment, the Relay Server 120 may employ the following API's provided by Control Room 130:

Enterprise Control Room API for Authentication—Uses the bots login API to automate the login process that allows a user with appropriate privileges to create, update or delete login credentials stored in the Credential Vault 144. The API takes two mandatory parameters and one optional parameter as input in JSON format: (i) The username of the Automation Anywhere user, (ii) The password of the Automation Anywhere user, and (iii) The apiKey needed only when the Enterprise Control Room is configured for Single Sign On (SSO). Remove this field if your Enterprise Control Room does not use SSO.

Enterprise Control Room API to manage bots login credentials—When the bot is deployed from Enterprise Control Room to the Bot Runner, the bot will auto-login into the Bot Runner (if the machine is locked/logged off). The Bot will use the credentials stored in the Credential Vault for auto-login. These credentials are set by the user using the Login Settings of the client. However, there could be cases when the user's Windows password is modified; especially in enterprises where there is a password rotation policy. In such cases, the user has to remember to update the new password. To automate the above process, the Control Room 130 provides a direct API to create, update or delete the Login Credentials stored in the Credential Vault 144. There are 2 steps to use this API: (i) Invoke the Authentication API, (ii) Invoke the Login Credentials API.

Enterprise Control Room Automations API—triggering of deployment of bots from an external system or a third-party application.

API to export and import Bots for Bot Lifecycle Management—permits customization of an organization's bot lifecycle management solution for an uninterrupted automation lifecycle. Usually, the Control Room 130 user has to depend on means other than Control Room (for example email) to deploy bots from one environment to another. The Export-Import APIs, permit easy introduction of a customized Bot Lifecycle Management (BLM) solution thus removing all external factors that could possibly disrupt the automation life cycle. This provides a number of features and benefits—(i) role-based access control, (ii) automatic export of dependencies (files and bots), (iii) audit and traceability on source and target environment for compliance, (iv) email notification on successful execution or failure of export and import. Further aspects of BLM are described in the following patent application which is assigned to the assignee of the present application: ROBOTIC PROCESS AUTOMATION SYSTEM WITH BOT LIFECYCLE MANAGEMENT AND SECURITY MANAGEMENT, filed on Jun. 30, 2018, assigned application Ser. No. 16/024,797, which application is hereby incorporated by reference in its entirety.

API for deploying and monitoring bot progress—permits the following: (i) retrieve details of a given bot from the server repository to identify its file id to be used for bot deployment; (ii) fetch list of devices (bot runners) available for automation and its automation status; (iii) deploy a bot on given device(s) and fetch its automation id.; (iv) monitor the bot progress based on automation id.

Filters in an API request body—filtering provides basic conditional queries and page control for processing web pages. There are three basic features related to filtering: filtering conditions, sorting columns, and pagination parameters.

Figure 4:
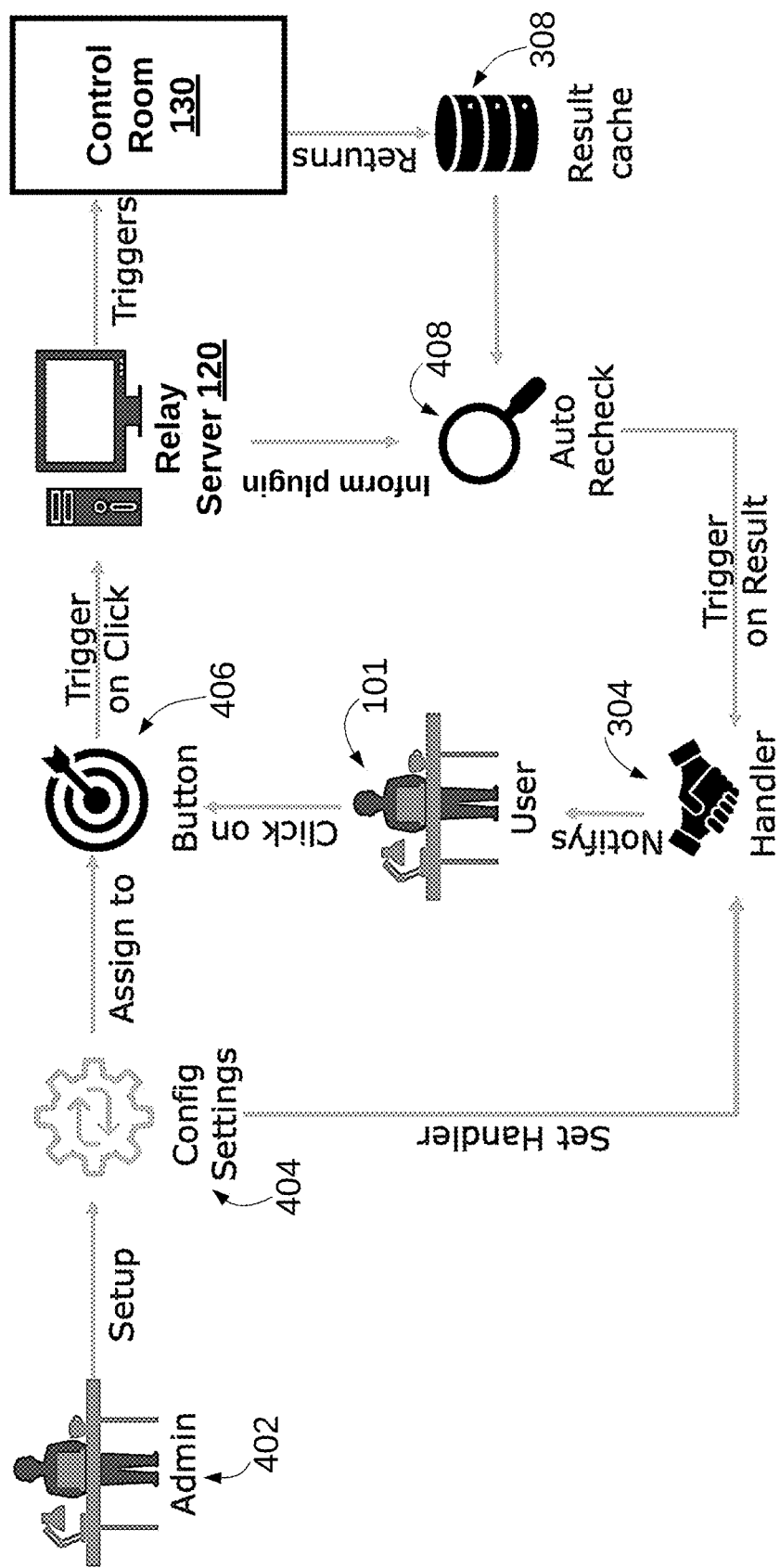
FIG. 4 is a flow diagram illustrating operation of the plugin.

FIG. 4 is a flow diagram illustrating operation of the plugin in conjunction with the system 10. Preferably, a system administrator 402 performs some initial setup of the plugin 108, by loading the plugin 108 on the device 102, providing configuration (config) settings (see at 404) in conjunction with the system 10 to simplify the interaction by the user 101 with the plugin 108 and the system 10. The config settings can include identifying one or more bots 134 to be executed by the user 101, identifying one or more device(s) 140 to execute bots 134 for the user 101 and identifying handler(s) (Set Handler) to process results received from bots 134. The user 101 then via device 102 invokes a spreadsheet application and clicks on the 'Automation' button in the spreadsheet application as provided by the plugin 108. Advantageously, the user may then invoke a bot 134 within the spreadsheet application. When the administrator 402 has configured the plugin 108 as described above, the invocation of bot 134 may be performed by a single user action (such as a click) where the data to be processed is selected within the spreadsheet by the user 101 and then the Run button at 208 is selected. The request to execute a bot 134 includes identification of the bot 134, in some embodiments, identification of the device 140, the user identification and credentials, and the data, which is one embodiment is provided in Comma Separated Value (CSV) format.

The relay server 120 interacts with the Control Room 130 in a manner as described above in connection with FIG. 3 to cause the task selected by the user 101 to be performed by one or more bots 134 under control of the Control Room 130. The relay server 120, upon providing the receiving the request from the plugin 108, informs the plugin 108 of the deployment of the bot 134 as such information is received from the Control Room 130. The plugin 108 then in one embodiment periodically at 408 polls the relay server 120 for results of the request. In another embodiment, the plugin 108 does not poll the relay server 120 but instead the relay server informs the plugin 108 upon receipt of the results of the request.

Results produced by the bots 134 are provided to the cache 308 via the Control Room 130 and are then provided to the plugin 108. Data returned by the relay server 120 in one embodiment is passed to the plugin in JavaScript Object Notation (JSON) format, which is an open-standard file format that uses human-readable text to transmit data objects consisting of attribute-value pairs and array data types (or any other serializable value). Upon receipt of the results the plugin 108 may automatically invoke an assigned handler at 304 to process the received results. Alternatively, the user 101 may be notified of the results and may then select a particular handler to process the received results. The received data by default is received into the same spreadsheet (in the same tab or different tab) from which the data for the processing request was passed. This is for security reasons to simplify security management which requires the spreadsheet to pass a key to the plugin 108, which is verified by the plugin 108 before providing results to the spreadsheet. This prevents the results from being received by another unauthorized file, which may be accessible by an unauthorized user. In another embodiment, the data may be passed to a different file, where the different file is identified by the plugin as an authorized file to receive the results.

Figure 5:
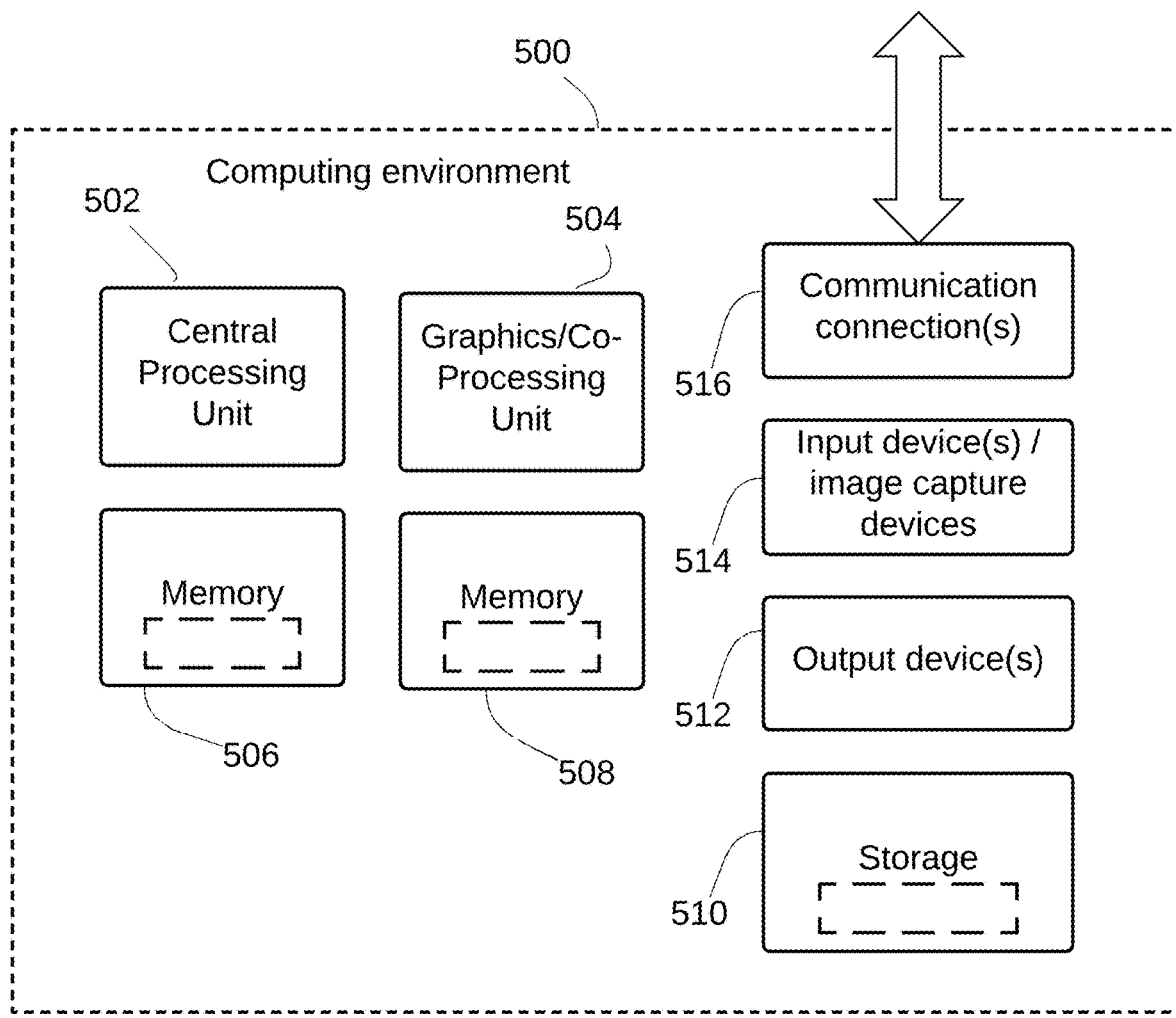
FIG. 5 illustrates a block diagram of hardware that may be employed in an implementation of the RPA systems disclosed herein.

FIG. 5 illustrates a block diagram of hardware that may be employed in an implementation of the RPA system as disclosed herein. FIG. 5 depicts a generalized example of a suitable general-purpose computing system 500 in which the described innovations may be implemented in order to improve the processing speed and efficiency with which the computing system 500 operates to perform the functions disclosed herein. With reference to FIG. 5 the computing system 500 includes one or more processing units 502, 504 and memory 506, 508. The processing units 502, 506 execute computer-executable instructions. A processing unit can be a general-purpose central processing unit (CPU), processor in an application-specific integrated circuit (ASIC) or any other type of processor. The tangible memory 506, 508 may be volatile memory (e.g., registers, cache, RAM), non-volatile memory (e.g., ROM, EEPROM, flash memory, etc.), or some combination of the two, accessible by the processing unit(s). The hardware components in FIG. 5 may be standard hardware components, or alternatively, some embodiments may employ specialized hardware components to further increase the operating efficiency and speed with which the system 100 operates. The various components of computing system 500 may be rearranged in various embodiments, and some embodiments may not require nor include all of the above components, while other embodiments may include additional components, such as specialized processors and additional memory.

Computing system 500 may have additional features such as for example, storage 510, one or more input devices 514, one or more output devices 512, and one or more communication connections 516. An interconnection mechanism (not shown) such as a bus, controller, or network interconnects the components of the computing system 500. Typically, operating system software (not shown) provides an operating system for other software executing in the computing system 500, and coordinates activities of the components of the computing system 500.

The tangible storage 510 may be removable or non-removable, and includes magnetic disks, magnetic tapes or cassettes, CD-ROMs, DVDs, or any other medium which can be used to store information in a non-transitory way, and which can be accessed within the computing system 500. The storage 510 stores instructions for the software implementing one or more innovations described herein.

The input device(s) 514 may be a touch input device such as a keyboard, mouse, pen, or trackball, a voice input device, a scanning device, or another device that provides input to the computing system 500. For video encoding, the input device(s) 514 may be a camera, video card, TV tuner card, or similar device that accepts video input in analog or digital form, or a CD-ROM or CD-RW that reads video samples into the computing system 500. The output device(s) 512 may be a display, printer, speaker, CD-writer, or another device that provides output from the computing system 500.

The communication connection(s) 516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A robotic process automation system for executing automation tasks, the robotic process automation system comprising:
a server configured to support execution of the automation tasks, the server operating to at least:
provide to a user device a plugin program that provides an automation user interface within a user interface of a productivity program, the automation user interface permitting a user of the user device to initiate execution of an automation task that operates on data contained in a productivity file opened by the productivity program when the user initiates execution of the automation task on the data contained in the productivity file;
receive a request from the plugin program to perform the automation task, the request specifying a pre-existing software robot to perform the automation task, the request further specifying data from the productivity file to be used by the software robot to perform the automation task;
control execution of the automation task by the pre-existing software robot;
receive results of the automation task; and
provide the results of the automation task to the plugin program, wherein the plugin program provides the results of the automation task to the user within a productivity file accessible by the user.

2. The robotic process automation system of claim 1 wherein the server provides the results of the automation task to the plugin program comprises providing the results of the automation task to a handler specified by the user, wherein the handler is preconfigured by the user to transform the data to present the data to the user in a productivity file as specified by the user.

3. The robotic process automation system of claim 1 wherein the user of the user device initiates execution of the automation task that operates on data contained in the productivity file opened by the productivity program by a single user action.

4. The robotic process automation system of claim 1 wherein results of the automation task from the server are transformed by a handler executing within the productivity program.

5. The robotic process automation system of claim 1 wherein the request from the plugin program further specifies identity and credentials of the user.

6. The robotic process automation system of claim 1 wherein the productivity program comprises a spreadsheet program and the productivity file comprises a spreadsheet file.

7. A robotic process automation system comprising:
a data storage device storing at least:
a plurality of sets of task processing instructions, each set of the task processing instructions operable to interact at a user level with one or more designated user level application programs; and
a plugin program that provides an automation user interface within a user interface of a productivity program, the automation user interface permitting a user of a user device to initiate execution of an automation task that operates on data contained in a productivity file opened by the productivity program when the user initiates execution of the automation task on the data contained in the productivity file;
a server processor operatively coupled to the data storage device and configured to execute instructions that when executed cause the server processor to at least:
provide the plugin program for installation on the user device;

receive a request from the plugin program to perform the automation task, the request specifying a pre-existing set of task processing instructions to perform the automation task, the request further specifying data from the productivity file to be used by a software robot to perform the automation task;

provide the request to perform the automation task to a control room server that controls execution of a plurality of different automation tasks by a plurality of different task processing instructions;

receive results of the automation task from the control room server; and provide the results of the automation task to the plugin program, wherein the plugin program provides the results of the automation task to the user within a productivity file accessible by the user.

8. The robotic process automation system of claim 7 wherein the server processor is further configured to execute instructions that when executed cause the server processor to provide the results of the automation task to the plugin program by providing the results of the automation task to a handler specified by the user, wherein the handler is preconfigured by the user to transform the data to present the data to the user in a productivity file as specified by the user.

9. The robotic process automation system of claim 7 wherein the user of the user device initiates execution of the automation task that operates on data contained in the productivity file opened by the productivity program by a single user action.

10. The robotic process automation system of claim 7 wherein results of the automation task from the control room server are transformed by a handler executing within the productivity program.

11. The robotic process automation system of claim 7 wherein the request from the plugin program further specifies identity and credentials of the user.

12. The robotic process automation system of claim 7 wherein the productivity program comprises a spreadsheet program and the productivity file comprises a spreadsheet file.

13. A non-transitory storage medium, having tangibly stored thereupon one or more program modules comprising computer-executable instructions for execution on a computer system, the computer-executable instructions causing the computer system to:

provide to a user device a plugin program that provides an automation user interface within a user interface of a productivity program, the automation user interface permitting a user of the user device to initiate execution of an automation task that operates on data contained in a productivity file opened by the productivity program when the user initiates execution of the automation task on the data contained in the productivity file;

receive a request from the plugin program to perform the automation task, the request specifying a pre-existing software robot to perform the automation task, the request further specifying data from the productivity file to be used by the software robot to perform the automation task;

provide the request to perform the automation task to a server that controls execution of a plurality of different automation tasks by a plurality of different software robots;

receive results of the automation task from the server; and provide the results of the automation task to the plugin program, wherein the plugin program provides the results of the automation task to the user within a productivity file accessible by the user.

14. The non-transitory storage medium of claim 13 wherein the operation to provide the results of the automation task to the plugin program comprises providing the results of the automation task to a handler specified by the user, wherein the handler is preconfigured by the user to transform the data to present the data to the user in a productivity file as specified by the user.

15. The non-transitory storage medium of claim 13 wherein the user of the user device initiates execution of the automation task that operates on data contained in the productivity file opened by the productivity program by a single user action.

16. The non-transitory storage medium of claim 13 wherein results of the automation task from the server are transformed by a handler executing within the productivity program.

17. The non-transitory storage medium of claim 13 wherein the request from the plugin program further specifies identity and credentials of the user.

18. The non-transitory storage medium of claim 13 wherein the productivity program comprises a spreadsheet program and the productivity file comprises a spreadsheet file.

* * * * *